United States Patent [19]

Hines et al.

[11] Patent Number: 5,022,665
[45] Date of Patent: Jun. 11, 1991

[54] WORKPIECE SUPPORT TOOL

[75] Inventors: Gordon E. Hines, Ann Arbor; Leonard J. Salenbien, Saline; Vernon J. Burzan, Ann Arbor, all of Mich.

[73] Assignee: Hines Industries, Inc., Ann Arbor, Mich.

[21] Appl. No.: 410,945

[22] Filed: Sep. 22, 1989

Related U.S. Application Data

[63] Continuation-in-part of Ser. No. 153,751, Feb. 8, 1988, abandoned.

[51] Int. Cl.[5] .............................................. B23B 31/00
[52] U.S. Cl. .................................... 279/2 R; 269/48.1; 279/121
[58] Field of Search ............... 279/2 R, 121; 242/72.1; 269/48.1

[56] References Cited

U.S. PATENT DOCUMENTS

| | | | |
|---|---|---|---|
| 1,361,773 | 12/1920 | Raison et al. | 279/2 R |
| 1,654,737 | 1/1928 | Kistner | 279/2 R |
| 2,352,042 | 6/1944 | Vander Linde | 242/72.1 |
| 2,693,784 | 11/1954 | Knapp | 279/2 R |
| 2,898,764 | 8/1959 | Kinsey et al. | |
| 3,048,416 | 8/1962 | Rogers | 279/2 R |
| 3,122,021 | 2/1964 | Karig | |
| 3,158,032 | 11/1964 | Lannen | |
| 3,203,255 | 8/1965 | Rexroat | |
| 4,492,346 | 1/1985 | Young | 242/72.1 |

FOREIGN PATENT DOCUMENTS 1393542  5/1988  U.S.S.R. ............... 279/2 R

Primary Examiner—Daniel W. Howell
Attorney, Agent, or Firm—Emch, Schaffer, Schaub & Porcello Co.

[57] ABSTRACT

An improved workpiece support tool is disclosed for use with a variety of workpieces. The support tool provides precise support and positioning of the workpiece with respect to an operational centerline during the balancing operation. The support tool includes a plurality of radially moving jaw members which are driven by an inverted cone-shaped drive member. The inverted cone-shaped drive member is moved along the axis of the support tool through driving forces imparted by a servo drive motor.

2 Claims, 4 Drawing Sheets

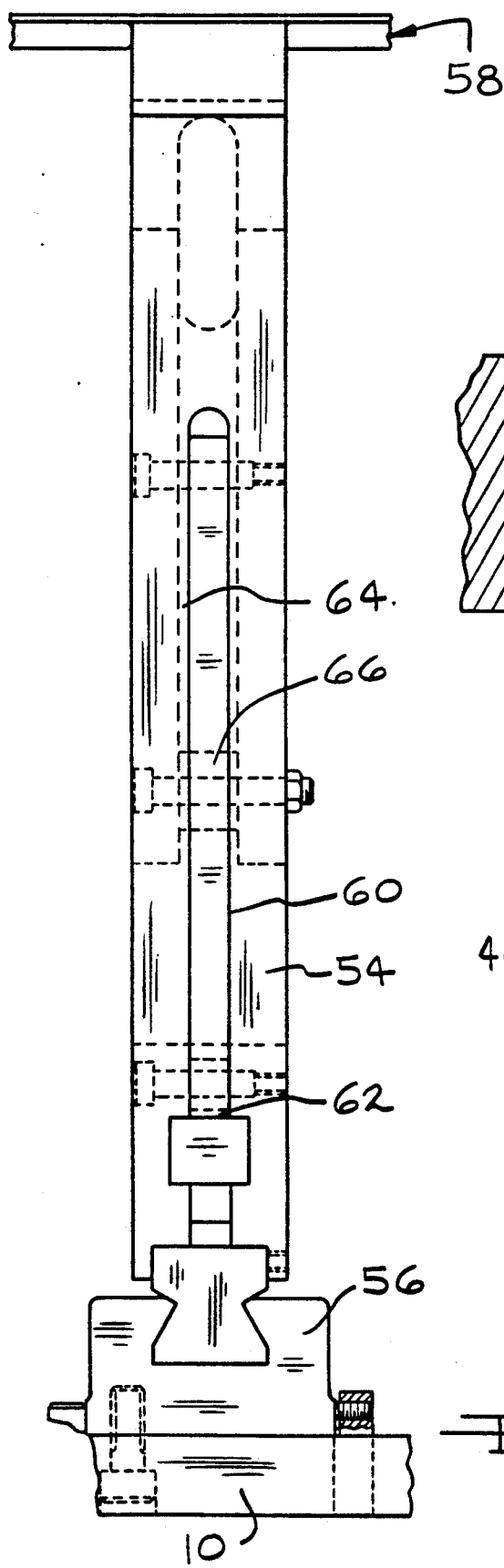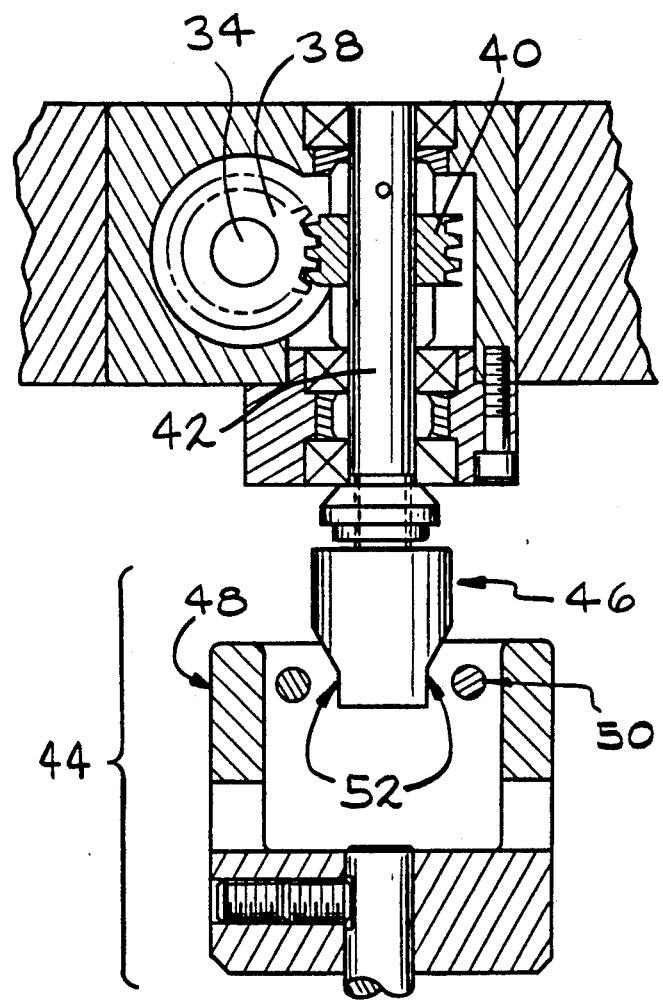

3,022,665

WORKPIECE SUPPORT TOOL

This is a continuation-in-part of copending application Ser. No. 07/153,751 filed on Feb. 8, 1988, now abandoned.

BACKGROUND OF THE INVENTION

The present invention provides an improved support tool for a workpiece which gives precise support and positioning of the workpiece with respect to an operational centerline.

There is a continuing need for a support tool to be used in engaging workpieces such as tires, and positioning those workpieces in a maintained level and oriented relationship with an operational centerline for the purposes of achieving accurate balancing of those workpieces. The present invention is an improvement upon the workpiece support tooling claimed in our earlier filed application. The workpiece support tooling of this invention is not intended to be limited to use with tires alone, but is envisioned as being applicable to the balancing operations used for many varied workpieces.

SUMMARY OF THE INVENTION

The present invention provides a support tool for a workpiece in need of balancing. The support tool will provide precise support and positioning of the workpiece with respect to an operational centerline during the balancing operation. The support tool includes a plurality of radially moving jaw members which are driven by an inverted cone-shaped drive member mounted for movement on a ball screw. The ball screw drive member is positioned on the axial centerline of the support tooling. The use of a single ball screw positioned along the axial centerline will inherently improve upon alignment problems encountered during the centering operation. The jaw members of the support tool are interjoined with the cone-shaped drive member so that the jaw members are moved in radially equidistant amounts as the drive member is propelled by the ball screw.

The ball screw is driven by a servo motor which is engaged with the ball screw through a no back bearing and appropriate translation gearing. Of course, other drive forms, even manual, will produce satisfactory results with this invention. The details and function of the jaw member components are very similar to those as disclosed in our copending application.

BRIEF DESCRIPTION OF THE DRAWINGS

FIG. 3 is a detail view of a jaw member engaged with the drive member of the workpiece support tool of the present invention.

FIG. 4 is a detail view of the drive gearing including the servo drive engagement device for the workpiece support tool of the present invention.

DETAILED DESCRIPTION OF THE PREFERRED EMBODIMENT

Figure 1:
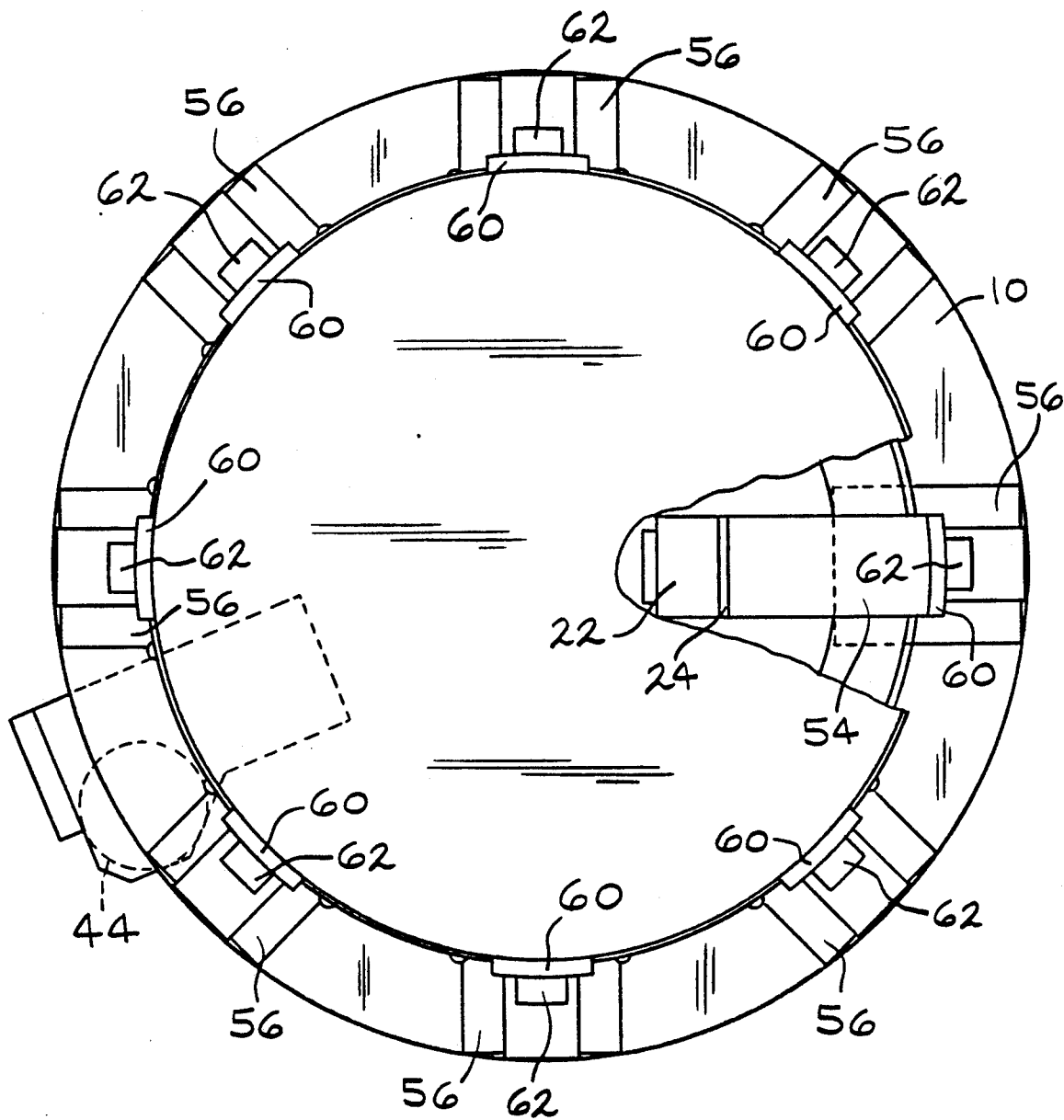
FIG. 1 is a top view of the workpiece support tool of the present invention with a cutaway showing the engagement of a jaw member with the drive member.
Figure 2:
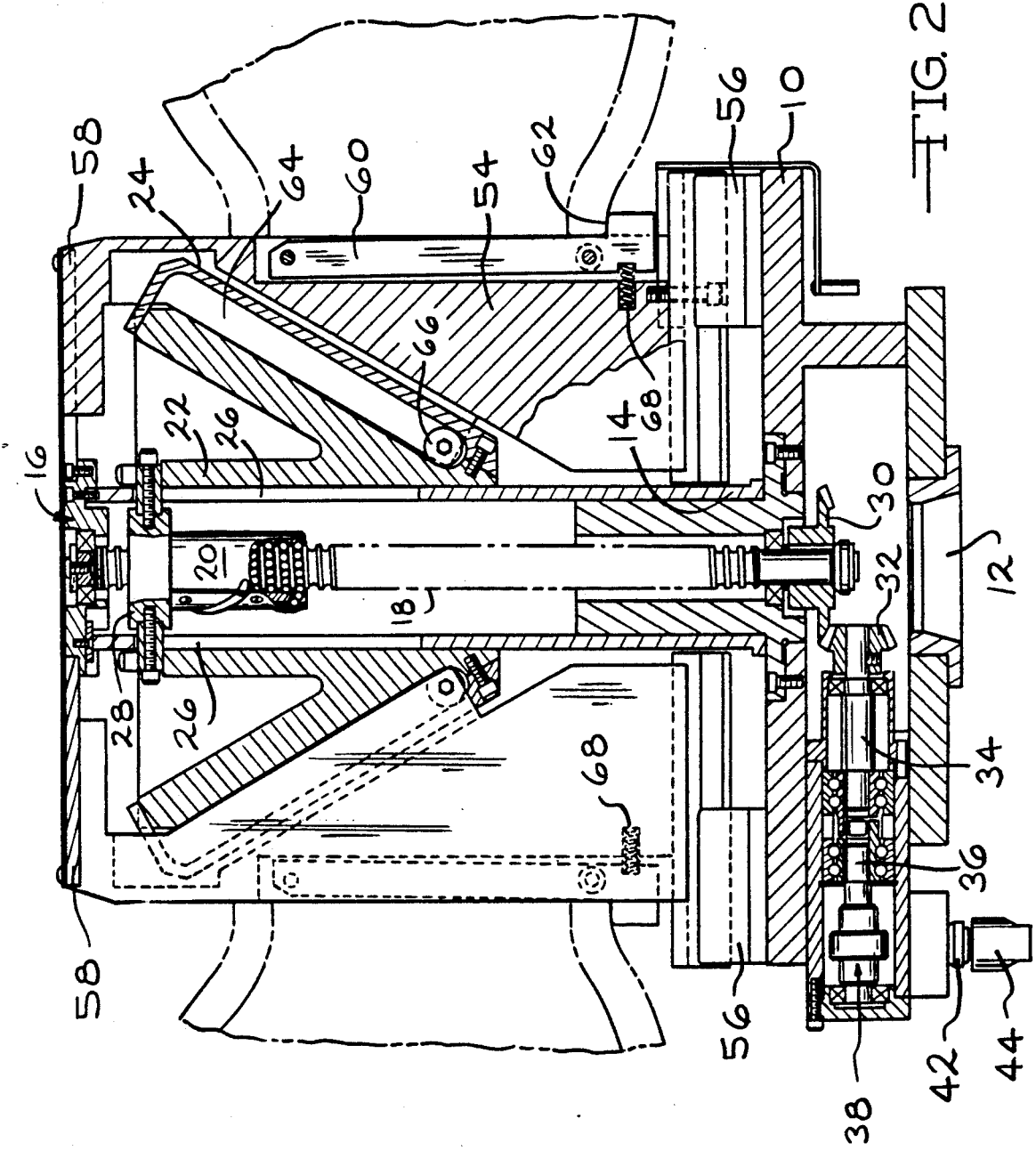
FIG. 2 is a sectional view of the workpiece support tool of the present invention with the jaw members extended in their smallest radial orientation.
Figure 5:
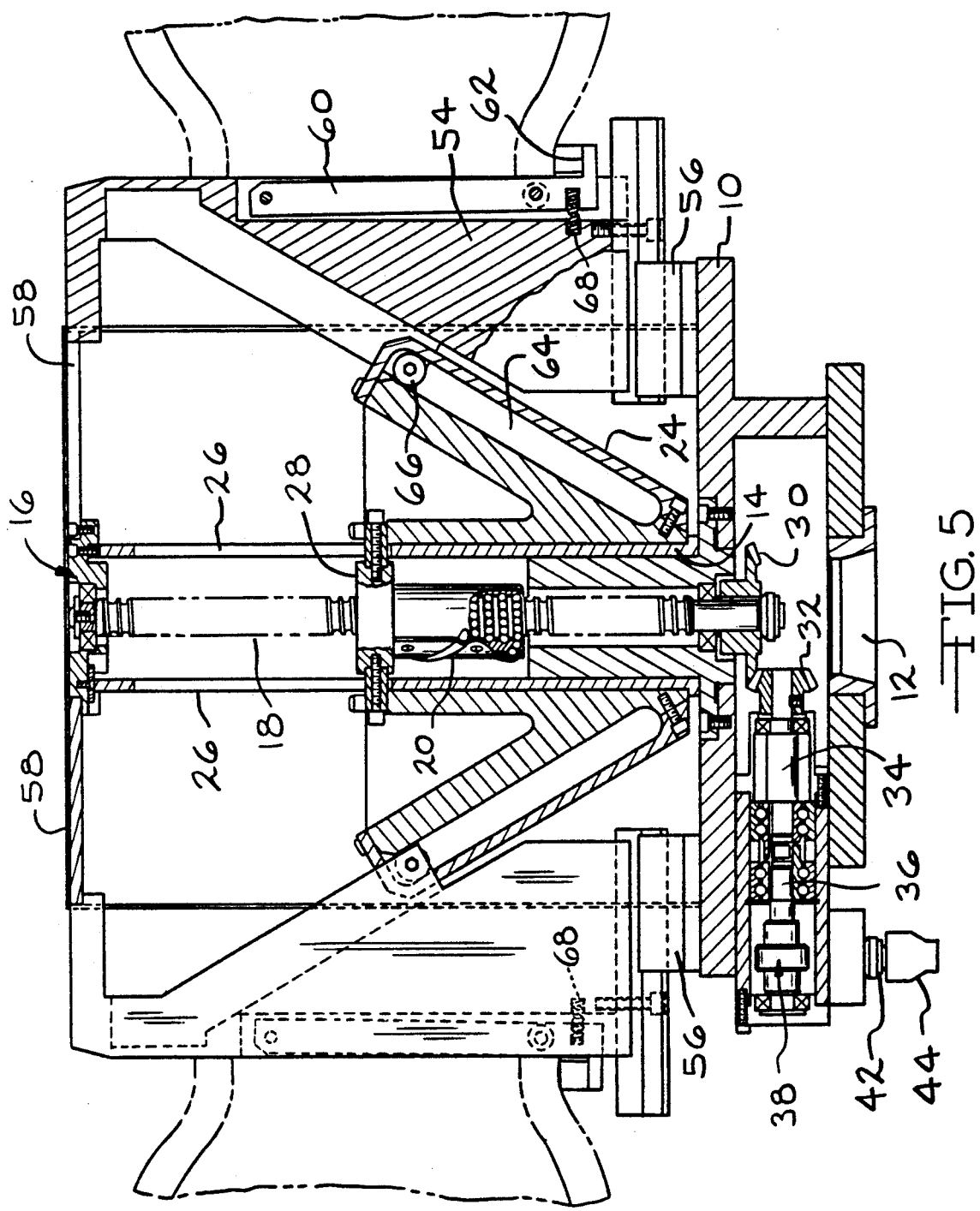
FIG. 5 is a sectional side view of the workpiece support tool of the present invention with the jaw members extended in their full radial orientation.

Referring the FIGS. 1, 2 and 5, the workpiece support tool of the present invention has a base member 10 which includes an engagement member 12 designed to place the support tool into an engaged relationship with a balancing machine wherein the axial centerline of the support tool coincides with the axial centerline of the balancing machine. A tubular member 14 extends along the axial centerline of the support tool from the base member 10. A cap member 16, opposed from the base member 10 is positioned on the tubular member 14. A ball screw member 18 is positioned on the axial centerline within the tubular member 14. The ball screw member 18 is engaged for rotation within the tubular member 14 between the base member 10 and the cap member 16. A ball nut member 20 is engaged on the ball screw member 18 to be driven along the ball screw member 18 as the ball screw is rotated. Positioned around the tubular member 14, between the cap member 16 and base member 10, is a drive member 22 having a plurality of identical inclined surfaces 24, such inclined surfaces 24 defining an inverted cone shape.

The tubular member 14 includes at least two opposed radially extending slots 26. The drive member 22 is engaged with the ball nut 20 by means of an attachment collar 28. Thus, as the ball screw 18 is rotated, the ball nut 20 imparts an axial motion to the drive member 22 causing the drive member 22 to axially move along the exterior surface of the tubular member 14.

The rotational motion of the ball screw 18 is provided through a series of motion translation gears which are driven by a servo drive motor (not shown). Referring to FIGS. 2 and 4, a first bevel gear 30 is fixed to the end of the ball screw 18. A second bevel gear 32 engages the first bevel gear 30. The second bevel gear 32 is driven by a shaft 34 which is engaged with a no back bearing 36. The end of the shaft 34 which is opposed to the bevel gear 32 includes a drive gear 38 designed to mate with a helical gear 40. The helical gear 40 is attached by a shaft 42 to an engagement coupling 44.

The engagement coupling 44 engages the servo drive motor (not shown) with the translation gearing. The engagement coupling 44 includes a male member 46 and a female member 48. Within the female member 48 are two engagement pins 50 designed to engage the surface of the male member 46 when the coupling 44 is in the engaged position. The engagement pins 50 will also act to engage the indented surface 52 of the male member 46 when the coupling 44 is in the disengaged position if the male member 46 and the female member 48 attempt to rotate with respect to each other. The disengaged engagement between the engagement pins 50 and the indented surface 52 prevents any unwanted rotation of the gearing when the servo drive motor is uncoupled. The engagement coupling 44 is used in the present invention to physically disconnect the servo drive motor from the translation gearing, thereby allowing the support tool with the workpiece to rest solely, without interference, on the unbalance measuring machine during the balancing operation.

A plurality of radially oriented jaw members 54 are positioned for radial movement between the base member 10 and the cap member 16. The jaw members 54 are mounted on the base member 10 in slides 56 which are designed to ensure that the jaw members 54 move solely in a radial direction. The jaw members 54 further engage a guide member 58 located on the cap member 16.

In the preferred embodiment there are eight jaw members 54 spaced equally about the centerline of the support tool. Each jaw member 54 of the support tool includes a vertically extending finger 60 mounted on the jaw member 54 to radially extend outward from the jaw member 54. A spring 68 is positioned between the finger member 60 and the jaw member 54 and acts to maintain the finger member 60 in a position slightly outside the radius of the jaw member 54. The finger member 60 includes an engagement surface 62 design to engage and support the workpiece. The spring positioned finger member 60 provides an increasing radial surface which engages the workpiece as the workpiece is lowered onto the support tool. This prevents unwanted distortion of the workpiece during loading and helps maintain the workpiece in a centered and level orientation with respect to the centerline of the support tool.

The jaw members 54 are engaged with the inclined surfaces 24 of the drive member 22. Each inclined surface 24 of the drive member 22 includes an engagement slot 64. Each jaw member 54 includes a pin 66 which is designed to interconnect with the engagement slot 64 of the inclined surface 24 of the drive member 22. As the ball screw 18 rotates and causes the drive member 22 to move axially through its engagement with the ball screw 18 by the ball nut 20 and engagement coupling 44, the pin 66 will slide in the engagement slot 64 thus causing the respective engaged jaw members 54 to move in an inward or outward radial direction with respect to the axial centerline of the support tool. Once the jaws are positioned, the no back bearing 36 will prevent any unwanted radial movement of the jaw members 54.

The present invention operates as follows. The jaw members 54 are positioned in a predetermined radial orientation according to information relating to the oncoming workpiece which is known to the operator. The jaw members 54 are positioned to have an outside diameter slightly less than the inside diameter of the workpiece. As the workpiece is lowered onto the support tool, the interior diameter of the workpiece engages the spring loaded finger member 60 and comes to rest on the engagement surface 62. The jaw members 54 are then radially expanded to a precalculated diameter designed to engage the workpiece with the jaw member 54 while the workpiece is resting on the engagement surface 62. The workpiece is then leveled with respect to the axis of the support tool and centered with respect to the axis of the support tool. After the balancing operation is completed, the jaw members 54 of the support tool retract slightly to disengage from the interior of the workpiece while the workpiece remains resting on the engagement surface 62 of the finger members 60. The workpiece may then be removed from the support tool.

The above description of the preferred embodiment is intended for illustrative purposes. It is anticipated that alternative embodiments may be employed to the same end without departing from the scope and content of the following claims.

We claim:

1. A workpiece support tool for engaging a workpiece having a specified inner diameter comprising, in combination:

a plurality of jaw members having an engagement surface disposed in equidistant radial amounts from the axial centerline of said support tool;

a ball screw positioned along the axial centerline of such tool and a ball nut engaged for movement on said ball screw;

an inclined member engaged with said ball nut and having a slide surface in communication with each of said jaw members, said slide surface having an inclined aperture extending the length of said slide surface and each jaw member having a fixed pin for engaging with said aperture of said slide surface, whereby rotation of said ball screw imparts movement to said ball nut and said inclined member wherein such communication between said slide surface and said jaw members cause said jaw members and said engagement surfaces to move solely in equidistant radial amounts to form an outer surface diameter of a specified radius intended to mate with such inner diameter of such workpiece.

2. A workpiece support tool or engaging a workpiece having a specified inner diameter comprising, in combination:

a plurality of jaw members having an engagement surface disposed in equidistant radial amounts from the axial centerline of said support tool, each of said jaw members including a finger member for initially engaging such inner diameter of the workpiece, said finger members being positioned to pivot radially from said engagement surfaces with respect to the centerline of said support tool, a resilient means engaging each of said finger members and their respective jaw members to bias each of said finger members radially away from its respective engagement surface;

a ball screw positioned along the axial centerline of such tool and a ball nut engaged for movement on said ball screw;

an inclined member engaged with said ball nut and in communication with each of said jaw members, whereby upon loading of the workpiece onto said tool, the workpiece initially engages said finger members and rotation of said ball screw imparts movement to said ball nut and said inclined member wherein such communication between said inclined member and said jaw members causes said jaw members to radially move to close said engagement surfaces upon said finger members and stabilize the engagement between said finger members and the workpiece, thereby causing the workpiece to align with the centerline of said tool.

* * * * *